United States Patent [19]

Hughey et al.

[11] Patent Number: 5,159,544

[45] Date of Patent: Oct. 27, 1992

[54] HIGH VOLTAGE POWER SUPPLY CONTROL SYSTEM

[75] Inventors: Daniel C. Hughey; Robert R. Atherton, both of Indianapolis, Ind.

[73] Assignee: Ransburg Corporation, Indianapolis, Ind.

[21] Appl. No.: 720,763

[22] PCT Filed: Oct. 10, 1989

[86] PCT No.: PCT/US89/04552

§ 371 Date: Aug. 12, 1991

§ 102(e) Date: Aug. 12, 1991

[87] PCT Pub. No.: WO90/07381

PCT Pub. Date: Jul. 12, 1990

[51] Int. Cl.[5] .............................................. B03C 3/02
[52] U.S. Cl. ...................................... 363/97; 323/903; 55/139
[58] Field of Search ...................... 55/139; 118/625; 239/690; 323/903; 363/25, 97, 134

[56] References Cited

U.S. PATENT DOCUMENTS

| | | | |
|---|---|---|---|
| 2,302,185 | 11/1942 | Campbell, Jr. | 299/1 |
| 2,302,289 | 11/1942 | Bramston-Cook | 21/1 |
| 2,509,277 | 5/1950 | Ransburg et al. | 91/18 |
| 2,650,329 | 8/1953 | Orndoff | 317/51 |
| 2,881,092 | 4/1959 | Sedlacsik, Jr. | 117/93 |
| 3,048,498 | 8/1962 | Juvinall et al. | 117/93 |
| 3,273,015 | 9/1966 | Fischer | 317/3 |
| 3,367,578 | 2/1968 | Juvinall et al. | 239/15 |
| 3,567,996 | 3/1971 | Gordon et al. | 317/3 |
| 3,599,038 | 8/1971 | Skidmore | 317/3 |
| 3,608,823 | 9/1971 | Buschor | 239/15 |
| 3,641,971 | 2/1972 | Walberg | 118/8 |
| 3,731,145 | 5/1973 | Senay | 317/3 |
| 3,851,618 | 12/1974 | Bentley | 118/7 |
| 3,872,370 | 3/1975 | Regnault | 317/3 |
| 3,875,892 | 4/1975 | Gregg et al. | 118/4 |
| 3,893,006 | 7/1975 | Algeri et al. | 317/3 |
| 3,894,272 | 7/1975 | Bentley | 317/3 |
| 3,895,262 | 7/1975 | Ribnitz | 317/3 |
| 4,000,443 | 12/1976 | Lever | 317/3 |
| 4,075,677 | 2/1978 | Bentley | 361/93 |
| 4,103,356 | 7/1978 | Finlay | 363/22 |
| 4,120,015 | 10/1978 | Haller | 361/227 |
| 4,148,932 | 4/1979 | Tada et al. | 427/31 |
| 4,165,022 | 8/1979 | Bentley et al. | 222/76 |
| 4,187,527 | 2/1980 | Bentley | 361/235 |
| 4,208,706 | 6/1980 | Suzuki et al. | 363/26 |
| 4,210,858 | 7/1980 | Ford et al. | 323/22 |
| 4,213,167 | 7/1980 | Cumming et al. | 361/213 |

(List continued on next page.)

FOREIGN PATENT DOCUMENTS

| | | | |
|---|---|---|---|
| 720418 | 12/1954 | United Kingdom | 38/4 |
| 1387632 | 3/1975 | United Kingdom . | |
| 2077066 | 12/1981 | United Kingdom . | |

OTHER PUBLICATIONS

Data sheet for National Semiconductor's Type CD 4046 CMOS Integrated Circuit, May 1965.

Primary Examiner—Steven L. Stephan
Assistant Examiner—Jeffrey Sterrett
Attorney, Agent, or Firm—Barnes & Thornburg

[57] ABSTRACT

The electrostatic potential supply comprises an operating potential source ($+V_{cc}$), a transformer (122) having primary (156) and secondary (172) windings, and a resonant frequency, and a high potential rectifier and multiplier (124). The electrostatic potential supply also includes a phase comparator (110) and a voltage controlled oscillator (114) having a free running frequency of substantially the transformer (122) resonant frequency. The phase comparator (110) generates a control signal related to the frequency difference between the signal from the secondary winding (172) and the signal from the primary circuit (110, 112, 114, 116, 118, 102-1, 2) to synchronize the voltage controlled oscillator (114) output frequency substantially with the frequency of the signal from the secondary winding (172). The voltage controlled oscillator (114) is coupled to the primary winding (156) to maintain the operating frequency of the transformer (122) substantially at its resonant frequency.

13 Claims, 4 Drawing Sheets

U.S. PATENT DOCUMENTS

| | | | |
|---|---|---|---|
| 4,251,735 | 2/1981 | Coleman | 307/45 |
| 4,257,089 | 3/1981 | Ravis | 363/25 |
| 4,331,298 | 5/1982 | Bentley et al. | 239/690 |
| 4,371,917 | 2/1983 | Bator | 363/21 |
| 4,402,030 | 8/1983 | Moser et al. | 361/93 |
| 4,463,415 | 7/1984 | Vollrath | 363/87 |
| 4,480,297 | 10/1984 | Chetty et al. | 363/26 |
| 4,481,557 | 11/1984 | Woodruff | 361/235 |
| 4,485,427 | 11/1984 | Woodruff et al. | 361/235 |
| 4,523,267 | 6/1985 | Mehl | 363/87 |
| 4,535,399 | 8/1985 | Szepesi | 363/41 |
| 4,560,950 | 12/1985 | Cabot | 331/1 |
| 4,587,475 | 5/1986 | Finney, Jr. et al. | 323/241 |
| 4,616,300 | 10/1986 | Santelmann, Jr. | 363/21 |
| 4,652,318 | 3/1987 | Masuda et al. | 156/89 |
| 4,672,521 | 6/1987 | Riesco | 363/41 |
| 4,677,534 | 6/1987 | Okochi | 363/21 |
| 4,700,285 | 10/1987 | Szepesi | 363/97 |
| 4,710,849 | 12/1987 | Norris | 361/228 |
| 4,730,243 | 3/1988 | Glennon | 363/44 |
| 4,745,520 | 5/1988 | Hughey | 361/228 |
| 4,783,728 | 11/1988 | Hoffman | 363/37 |
| 4,893,227 | 1/1990 | Gallios et al. | 363/26 |
| 5,008,800 | 4/1991 | Klinkowstein | 363/61 |

HIGH VOLTAGE POWER SUPPLY CONTROL SYSTEM

BACKGROUND OF THE INVENTION FIELD OF THE INVENTION

This invention relates to electrical circuits for generating high magnitude electrostatic potentials, and particularly to a system for driving a high voltage transformer. The system utilizes a phase-lock technique to drive the high voltage transformer at or near its resonant frequency. The invention is disclosed in the context of high magnitude electrostatic potential generating systems for use in electrostatically-aided coating material application systems, such as liquid and powder coating systems.

DESCRIPTION OF THE RELATED ART

Industrial electrostatic coating systems typically use high voltage direct current power supplies to produce high magnitude potentials of up to 150 kilovolts (KV) DC across a pair of output terminals. One of the terminals is generally held at or near ground potential while the other terminal is held at a high magnitude (typically negative) potential. The high magnitude potential terminal is coupled to a device that charges particles of the coating material as they are dispensed.

Articles to be coated are maintained at a low magnitude potential, typically at or near ground. The articles can be moved past the coating dispensing device, for example, on a conveyor. The atomized and charged coating material moves through the electric field between the dispensing device and the article. The charged coating material strikes the article and sticks to it.

The possibility of spark discharge between the charging device and the articles and other nearby grounded surfaces creates a considerable hazard in industrial electrostatic coating systems. Certain materials used in coating processes are volatile and flammable. The desirability of a system which prevents such spark discharge is apparent.

Spark discharges may occur when the potential across the device-to-article space exceeds the dielectric strength of the space, such as when the device and article get too close to each other or when the magnitude of the potential on the device is permitted to get too high. Typical electrostatic coating systems use relatively large transformers operating at frequencies well below the knee of the frequency response curve of the transformer. In known electrostatic coating systems, the transformer is selected so that the desired output voltage (around 15 KV peak-to-peak) is obtained in the flat, linear range of the frequency response curve. Changes in the operating conditions of the system, such as when the operating frequency of the system varies, do not affect the transformer output voltage unless the operating frequency approaches the transformer resonant frequency. As the operating frequency approaches the transformer's resonant frequency, the voltage across the transformer's output terminals can increase fairly rapidly above the nominal voltage level, increasing the likelihood of a spark discharge.

Just prior to spark discharge, an increase in current across the high-magnitude potential terminals is ordinarily noted. This current increase has been the focus of much of the spark-discharge prevention equipment in use today. See, for example, U.S. Pat. Nos.: 3,851,618; 3,875,892; 3,894,272; 4,075,677; 4,187,527; and 4,402,030. It has also been noted, and use has been made of the fact in the prior art, that if the Stored energy in the charging/dispensing device and associated circuit components can be rapidly dissipated by this increase in current that presages a spark discharge, such a discharge can ordinarily be averted. See, for example, U.S. Pat. No. 4,745,520. Other prior art which may be of interest includes U.S. Pat. Nos.: 3,599,038; 3,608,823; 3,731,145; 4,165,022; and 4,331,298.

Two common methods are used for powering a transformer to drive the DC multiplier for generating high DC potentials necessary to operate the charging device. One method utilizes a self-sustaining power oscillator designed to operate at the resonant frequency of the transformer. The self-sustaining oscillator is inefficient because it operates in class A. In addition, under overload conditions, a self-sustaining system can double-mode or even cease oscillating. This causes the design of fault protection circuitry to be difficult.

The second method utilizes a driven power converter that forces the transformer to operate at the driven frequency. Even if the driven frequency is initially adjusted to the transformer resonant frequency, significant changes occur in the transformer resonant frequency due to circuit warmup and ambient temperature effects. The large number of transformer secondary turns, the design and fabrication practices for high voltage coils, and the nature of the DC multiplier load create a secondary circuit with a moderately high Q factor. Therefore, any shift in the frequency at which resonance occurs can drastically alter circuit performance.

SUMMARY OF THE INVENTION

It is an object of the present invention to provide an electrostatically-aided coating dispensing system in which the maximum output voltage of the transformer provides the required voltage to drive the charging device, thereby reducing the likelihood that the transformer can be driven at a level at which unwanted spark discharges are possible.

It is an object of the present invention to utilize a high Q transformer driven at substantially its resonant frequency so that the maximum voltage output of the transformer is obtained.

It is an object of the present invention to provide a phase-locked loop to maintain the operating frequency of the transformer substantially at its resonant frequency.

According to the present invention, a high magnitude electrostatic potential supply and an electrostatic potential utilization device are provided with means for coupling the electrostatic potential supply to the utilization device. The electrostatic potential supply comprises an operating potential source, a transformer having primary and secondary windings and a resonant frequency, a high potential rectifier and multiplier, means for coupling the operating potential source to the primary winding and means for coupling the secondary winding to the high potential rectifier and multiplier. The electrostatic potential supply further comprises a phase comparator having first and second inputs and an output. Means are provided for coupling the phase comparator output to an input of a voltage controlled oscillator having a free running frequency of substantially the transformer resonant frequency. Means are provided for coupling the secondary winding to the first input of the phase comparator and the output of the voltage controlled oscillator to the second input of the phase comparator. The circuit further comprises means for driving the primary winding of the transformer, means for coupling the driving means to the primary winding, and means for coupling the voltage controlled oscillator to the driving means to maintain the operating frequency of the transformer substantially at its resonant frequency.

Illustratively according to the invention, the phase comparator controls the voltage controlled oscillator output such that the signal from the secondary winding and the output signal of the voltage controlled oscillator are displaced in phase by about 90 degrees.

Further, according to the present invention, the means for coupling the secondary winding to the phase comparator comprises means for attenuating the voltage signal from the secondary winding.

Additionally, according to the present invention, the means for coupling the phase comparator output to the voltage controlled oscillator input comprises a low pass filter.

BRIEF DESCRIPTION OF THE DRAWING

The invention may best be understood by referring to the following description and the accompanying drawings which illustrate the invention. In the drawings.

DESCRIPTION OF THE ILLUSTRATED EMBODIMENT

Figure 1:
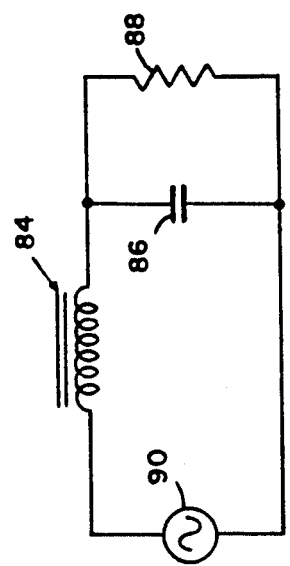
FIG. 1 illustrates a simplified equivalent circuit of a transformer which is used in the present invention.

FIG. 1 illustrates a simplified equivalent circuit for the transformer used in the present invention. Because the transformer primary and secondary windings are wound on opposite legs of a double-U ferrite core which maintains a nominal magnetic air gap, a significant leakage reactance 84 exists between the two windings. The large number of secondary turns required to generate high voltage creates a large distributed capacitance 86 across the secondary winding. These two reactive components 84 and 86, along with the effective load resistance 88 comprise the passive elements of the circuit of FIG. 1. The source voltage 90 is equal to the transformer secondary-to-primary turns ratio times the voltage supplied to the primary winding. Although the primary drive waveform is a square wave, the load voltage is nearly sinusoidal because of operation at resonance.

Figure 2A:
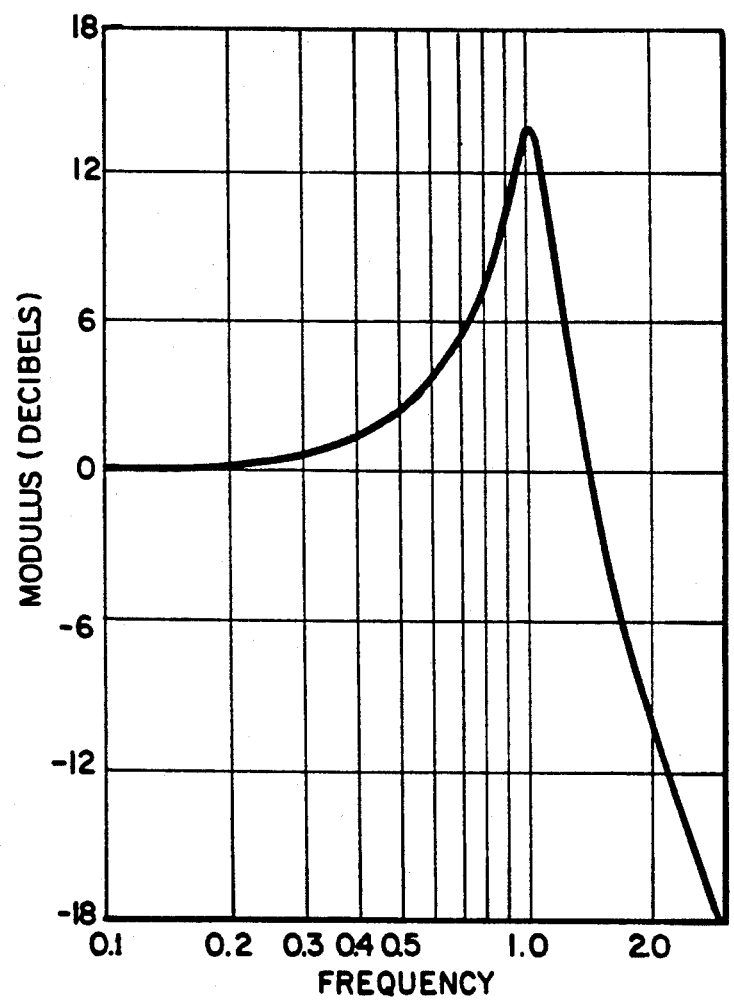
FIG. 2a is a plot of the logarithm of the magnitude of the ratio of output voltage to input voltage versus the logarithm of frequency for a second order system useful in understanding the present invention.
Figure 2B:
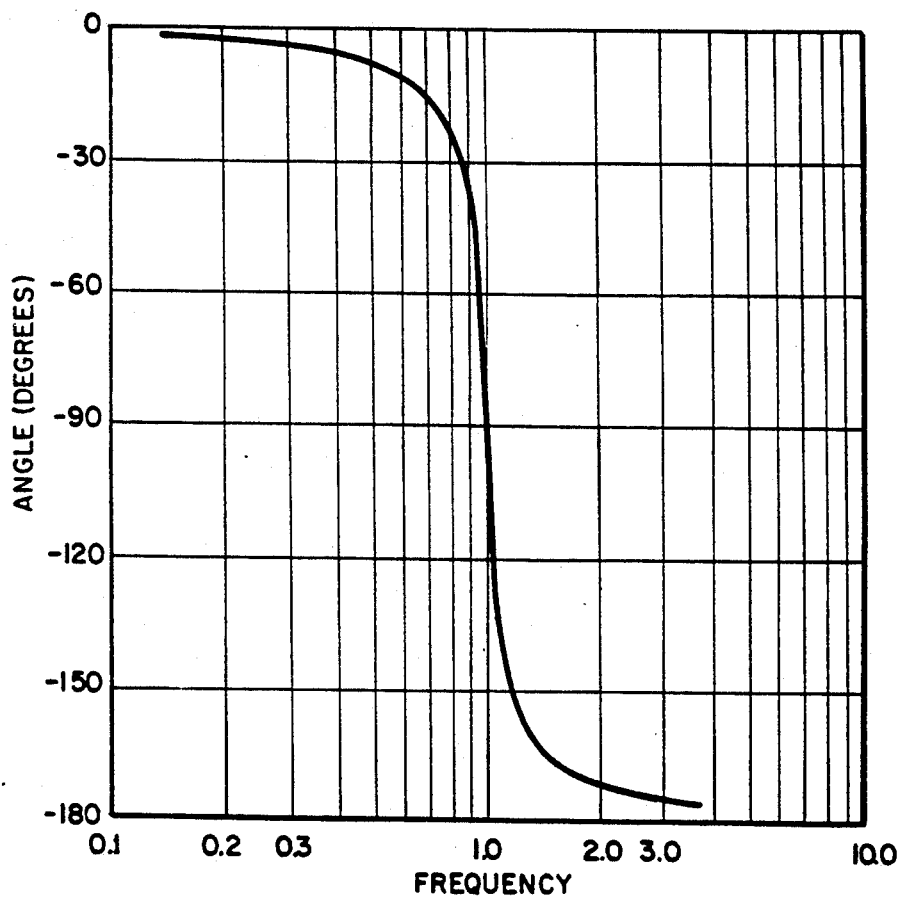
FIG. 2b is a plot of the phase angle between output voltage and input voltage versus the logarithm of frequency for a second order system.

The circuit of FIG. 1 is a second order system with the circuit Q factor determined by the effective load resistance 88. FIGS. 2a and 2b illustrate the plots of amplitude and phase of the ratio $V_{out}/V_{in}$ versus frequency for such a high Q second order system. Although both the amplitude and phase are functions of Q, the phase curve passes through 90 degrees at resonance, without regard for the value of Q. That is, resistive loading does not alter the 90 degree phase shift at resonance. The present system uses this 90 degree phase shift characteristic at resonance to maximize system performance by maintaining circuit operation substantially at transformer resonance.

Figure 3:
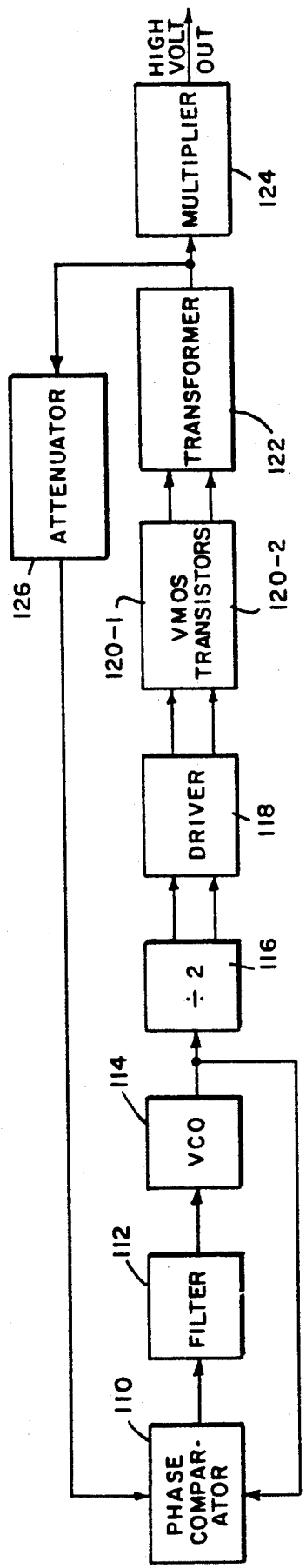
FIG. 3 illustrates a block diagram of a system constructed according to the present invention; and, FIG. 4 illustrates a partly block and partly schematic diagram of a system constructed according to the present invention.

FIG. 3 illustrates in block diagram form an electrical circuit for generating high magnitude electrostatic potentials. The system includes a phase comparator 110, a low pass filter 112, and a voltage controlled oscillator (VCO) 114. The VCO 114 provides an output signal to drive the primary winding of a transformer 122. VCO 114 has a free running frequency of substantially the resonant frequency of transformer 122. The output of VCO 114 is coupled to a divide by two counter 116 to insure a 50 percent duty cycle waveform for driving VMOS transistors 120-1 and 120-2 used to drive transformer 122. This reduces the likelihood of any saturation of the transformer 122 which might result from any waveform asymmetry.

The output of the divide by two counter 116 is coupled to a driver 118 which buffers the drive waveforms from VCO 114 and supplies the large peak current required by the VMOS transistors 120-1 and 120-2. Transistors 120-1 and 120-2 are coupled to opposite ends of the center-tapped primary winding of transformer 122. A high voltage AC signal appears across the secondary winding of transformer 122. The high voltage AC signal across the secondary winding of transformer 122 is coupled to a multiplier 124 which rectifies and multiplies the AC signal to produce the desired high magnitude DC output voltage.

The high voltage AC signal from the secondary winding of transformer 122 is also coupled to an attenuator 126. Attenuator 126 is coupled to one input of phase comparator 110. The output of VCO 114 is coupled to a second input of the phase comparator 110. Phase comparator 110 compares the phases of the signals from the attenuator 126 and VCO 114 and generates a control signal related to the phase difference. The output of phase comparator 110 is coupled to a low pass filter 112 to provide a DC control voltage. The output of low pass filter 112 is coupled to the VCO 114 to synchronize the output frequency of VCO 114 with the frequency from attenuator 126.

The VCO 114 operates initially at its free running frequency which is set to substantially the resonant frequency of the transformer 122. The control signal from the phase comparator 110, after passing through low pass filter 112, is applied to the control terminal of VCO 114. The control voltage forces the VCO 114 output frequency to change in the direction which increases or reduces to 90° the phase difference between the signal from attenuator 126 and the VCO 114 output signal. If the frequency from the attenuator 126 is sufficiently close to the frequency of the VCO 114 output signal, the phase-locked loop synchronizes the signal from the VCO 114 with the signal from the attenuator 126.

Figure 4:
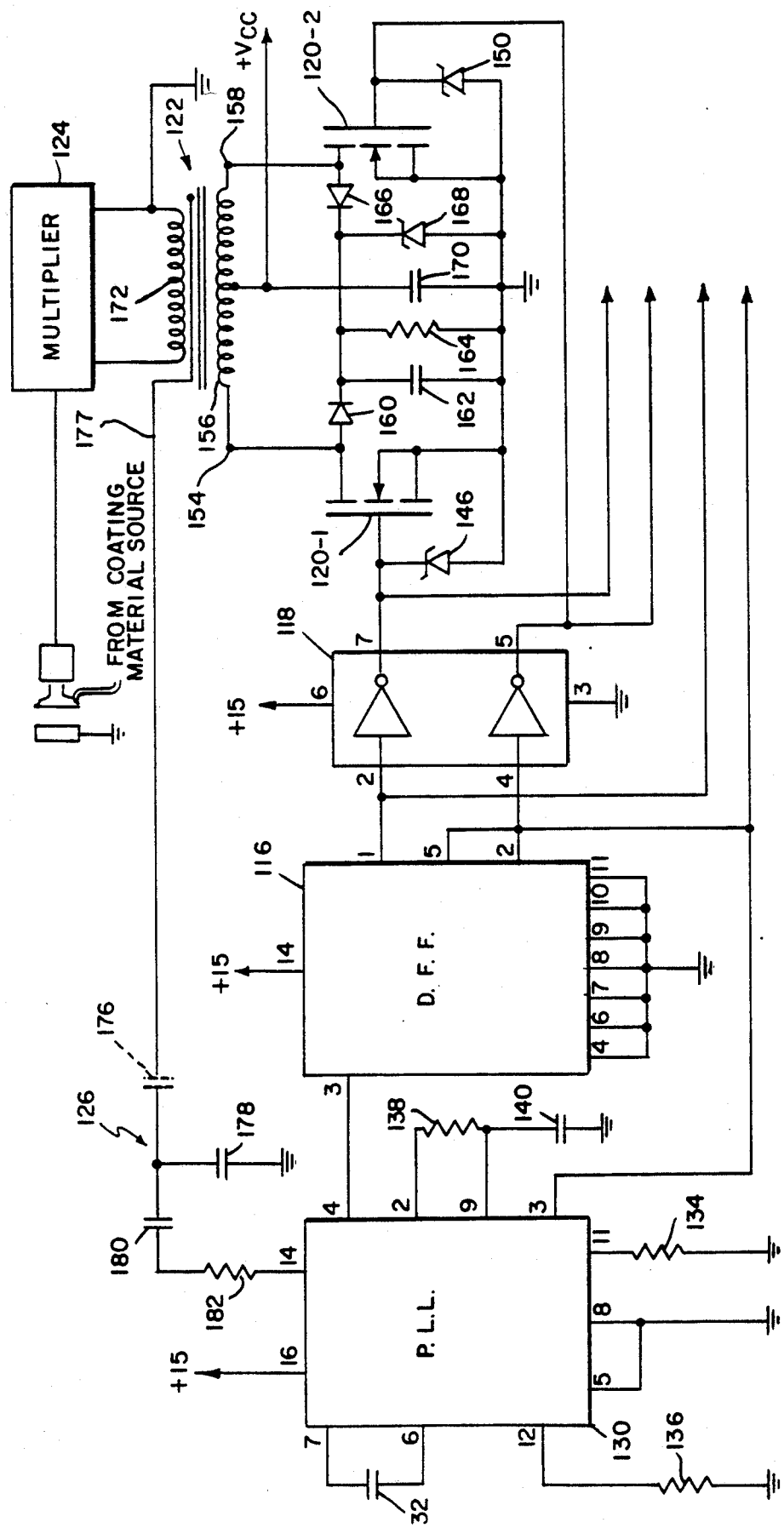

Referring now to FIG. 4, the phase comparator 110, low pass filter 112, and VCO 114 from FIG. 3 are included in a phase-locked loop integrated circuit 130. Circuit 130 illustratively is a National Semiconductor type CD4046 CMOS integrated circuit. The pin numbers illustrated in the drawing are those applicable when this particular integrated circuit is employed for this purpose. This convention will be used when referring to various integrated circuits described throughout this detailed description. It should be understood that other integrated circuits can be employed for the purposes for which the various integrated circuits described herein are used.

The free running frequency of the VCO of circuit 130 is established by the circuit on pins 6, 7 and 11 of circuit 130. This circuit includes a 0.001 uF capacitor 132 coupled across pins 6 and 7 and a 15K resistor 134 coupled between pin 11 and ground. Pins 5 and 8 of circuit 130 are coupled to ground, and pin 12 is coupled through 1M resistor 136 to ground. Pin 16 of circuit 130 is coupled to a +15 VDC supply voltage. Pin 2 of circuit 130, the output of the phase comparator, is coupled through the series combination of a 100K resistor 138 and a 0.1 uF capacitor 140 to ground. The common terminal of resistor 138 and capacitor 140 is coupled the VCO input terminal, pin 9 of circuit 130.

The output of the VCO, from pin 4 of circuit 130, is coupled to pin 3 of a D flip-flop integrated circuit 116. Circuit 116 illustratively is a National Semiconductor type CD4013 dual D flip-flop integrated circuit. Pin 14 of circuit 116 is coupled to +15 VDC. Pins 4, 6, 7, 8, 9, 10, and 11 of circuit 116 are coupled to ground. Circuit 116 is connected in a divide by two configuration.

The Q output from pin 1 of circuit 116 is coupled to pin 2 of a driver integrated circuit 118. Circuit 118 illustratively is a Teledyne type TSC426 integrated circuit. The Q output from pin 2 of circuit 116 is coupled to pin 4 of circuit 118. Pins 2 and 5 of circuit 116 are coupled together. Pin 2 of circuit 116 is coupled to pin 3 of circuit 130 which is one input to the phase comparator.

Pin 3 of circuit 118 is coupled to ground. Pin 6 of circuit 118 is coupled to +15 VDC. Pin 7 of circuit 118 is coupled to the cathode of a 1N4746A zener diode 146. The anode of zener diode 146 is coupled to ground. Pin 7 of integrated circuit 118 is also coupled to the gate electrode of VMOS FET 120-1. Pin 5 of circuit 118 is coupled to the cathode of a 1N4746A zener diode 150, and the anode of zener diode 150 is coupled to ground. Pin 5 of circuit 118 is also coupled to the gate electrode of VMOS FET 120-2. FETs 120-1 and 120-2 are illustratively International Rectifier type IRF520 FETs.

The source electrode of FET 120-1 is coupled to ground, and the drain electrode of FET 120-1 is coupled to terminal 154 of primary winding 156. The source electrode of FET 120-2 is coupled to ground, and the drain electrode of FET 120-2 is coupled to terminal 158 of primary winding 156.

Terminal 154 of primary winding 156 is coupled to the anode of a 1N6080 diode 160. The cathode of diode 160 is coupled to the cathode of a 1N6080 diode 166 and the anode of diode 166 is coupled to terminal 158 of primary winding 156. The common terminal of diodes 160 and 166 is coupled to ground through the parallel combination of a 0.01 uF capacitor 162 and a 15K resistor 164. The common terminal of diodes 160 and 166 is also coupled to the cathode of a 1N4754 zener diode 168. The anode of diode 168 is coupled to ground. An operating potential source is coupled to the center tap of primary winding 156, and the center tap is coupled to ground through a 47 uF capacitor 170.

The output signal from secondary winding 172 is a high voltage AC signal. The secondary winding 172 is coupled to high voltage rectifier and multiplier 124 which provides a high voltage DC output to drive an electrostatic potential utilization device of any suitable type such as, for example, the type described in U.S. Pat. No. 4,148,932.

A high voltage sample from the secondary winding is obtained by placing a length 177 of high voltage wire in close proximity to the transformer secondary winding 172. This configuration approximates a 1 pF capacitor 176. It is understood that capacitor 176 which is illustrated in broken lines is the effective capacitance of the configuration of the length 177 of cable and secondary 172.

The length 177 of high voltage wire is coupled to ground through a 0.001 uF capacitor 178. Effective capacitance 176 and capacitor 178 provide a 1000-to-1 high voltage attenuator 126. The distance of the separation of the high voltage wire from the secondary winding 172 is determined by observation of the low voltage sample from the attenuator 126. Because integrated circuit 130 has an extremely high input impedance, the attenuator 126 preserves the phase relationship between the high voltage AC signal from secondary winding 172 and the low voltage sample from the attenuator 126. Because the transformer secondary winding 172 operates around 15 KV peak-to-peak, the 15 V peak-to-peak low voltage sample from the attenuator 126 provides a nearly optimum input level for circuit 130.

In place of length 177 of high voltage wire, a one- or two-turn winding on the secondary side of transformer 122 can be used to generate the high voltage sample which is fed back to integrated circuit 130 .

The length 177 of high voltage wire is also coupled through the series combination of a 0.01 uF capacitor 180 and a 1K resistor 182 to pin 14 of circuit 130. Resistor 182 is a current limiting resistor. Pin 14 of circuit 130 is an input to the phase comparator.

Two types of phase comparators are included in circuit 130. A type I phase comparator tends to lock when its two inputs are displaced in phase by 90 degrees. Because a 90 degree phase shift exists between the transformer primary and secondary windings 156 and 172 at resonance and no other phase shifts occur within the circuit, the present system uses the type I phase comparator. The phase comparator controls the VCO to run at substantially transformer 122 resonant frequency.

The maximum output voltage of the secondary winding provides the required voltage to operate the charging device. Because the transformer has a high Q value, any variation in frequency away from the resonant frequency of the transformer will substantially reduce the output voltage of the transformer. Therefore, the risk of spark discharges caused by overdriving the transformer is eliminated by the present invention.

Although the invention has been described in detail with reference to a certain preferred embodiment, variations and modifications exist within the scope and spirit of the invention as described and defined in the following claims.

We claim:

1. In combination, a high magnitude electrostatic potential supply, an electrostatic potential utilization device, and means for coupling the electrostatic potential supply to the utilization device, the electrostatic potential supply comprising an operating potential source, a transformer having primary and secondary windings, a high potential rectifier and multiplier having a pair of output terminals, means for coupling the operating potential source to the primary winding, means for coupling the secondary winding to the high voltage rectifier and multiplier, the circuit including the transformer and the high voltage rectifier and multiplier having a resonant frequency and a high Q, a phase comparator having first and second inputs, a voltage controlled oscillator having a free running frequency of substantially the transformer resonant frequency, means for coupling the secondary winding to the first input of the phase comparator, means for coupling the output of the voltage controlled oscillator to the second input of the phase comparator, means for driving the primary winding of the transformer, means for coupling the driving means to the primary winding, and means for coupling the voltage controlled oscillator to the driving means to maintain the operating frequency of the transformer substantially at the resonant frequency, variation of the operating frequency from the resonant frequency rapidly reducing the voltage across the output terminals of the high voltage rectifier and multiplier.

2. The combination of claim 1 wherein the phase comparator controls the voltage controlled oscillator output such that the signal from the secondary winding and the output signal of the voltage controlled oscillator are displaced in phase by about 90 degrees.

3. The combination of claim 1 wherein the means for coupling the secondary winding to the first input of the phase comparator comprises means for attenuating the voltage signal from the secondary winding, means for coupling the secondary winding to the attenuating means, and means for coupling the attenuating means to the first input of the phase comparator.

4. The combination of claim 1 and further comprising a low pass filter, means for coupling the phase comparator to the low pass filter, and means for coupling the low pass filter to the input of the voltage controlled oscillator.

5. In combination, a high magnitude electrostatic potential supply, an electrostatic potential utilization device, and means for coupling the electrostatic potential supply to the utilization device, the electrostatic potential supply comprising an operating potential source, a transformer having primary and second windings, a high potential rectifier and multiplier having a pair of output terminals, means for coupling the operating potential source to the primary winding, means for coupling the secondary winding to the high voltage rectifier and multiplier, the circuit including the transformer and the high voltage rectifier and multiplier having a resonant frequency and a high Q, a voltage controlled oscillator having a free running frequency of substantially the transformer resonant frequency, means for comparing the frequency of a signal from the secondary winding with the frequency of the output signal of the voltage controlled oscillator, the comparing means generating a control signal related to the frequency difference between the signal from the secondary winding and the signal from the voltage controlled oscillator output, means for coupling the comparing means to the input of the voltage controlled oscillator to substantially synchronize the voltage controlled oscillator output frequency with the frequency of the signal from the secondary winding, means for driving the primary winding of the transformer, means for coupling the driving means to the primary winding, and means for coupling the voltage controlled oscillator to the driving means to maintain the operating frequency of the transformer substantially at the resonant frequency, variation of the operating frequency from the resonant frequency rapidly reducing the voltage across the output terminals of the high voltage rectifier and multiplier.

6. The combination of claim 5 wherein the control signal controls the voltage controlled oscillator output such that the signal from the secondary winding and the output signal of the voltage controlled oscillator are displaced in phase by about 90 degrees.

7. The combination of claim 5 and further comprising means for attenuating the voltage signal from the secondary winding, means for coupling the secondary winding to the attenuating means, and means for coupling the attenuating means to the comparing means.

8. The combination of claim 5 wherein the means for coupling the comparing means to the voltage controlled oscillator input comprises a low pass filter, means for coupling the comparing means to the low pass filter, and means for coupling the low pass filter to the voltage controlled oscillator input.

9. In combination, a high magnitude electrostatic potential supply, an electrostatic potential utilization device, and means for coupling the electrostatic potential supply to the utilization device, the electrostatic potential supply comprising an operating potential source, a transformer having primary and secondary windings, a high potential rectifier and multiplier having a pair of output terminals, means for coupling the operating potential source to the primary winding, means for coupling the secondary winding to the high voltage rectifier and multiplier, the circuit including the transformer and the high voltage rectifier and multiplier having a resonant frequency and a high Q, means for driving the primary winding of the transformer, means for generating an input signal to control the operating frequency of the driving means, the frequency of the input signal being variable and having an initial frequency of substantially the transformer resonant frequency, means for coupling the generating means to the driving means, means for comparing the frequency of a signal at the primary winding with the frequency of a signal at the secondary winding, the comparing means generating a control signal related to the frequency difference between the signals at the primary and secondary windings, means for coupling the comparing means to the generating means so that the control signal substantially synchronizes the frequency of the input signal with the frequency of the signal from the secondary winding to maintain the operating frequency of the transformer substantially at the resonant frequency, variation of the operating frequency from the resonant frequency rapidly reducing the voltage across the output terminals of the high voltage rectifier and multiplier.

10. The combination of claim 9 wherein the generating means includes a voltage controlled oscillator having a free running frequency of substantially the transformer resonant frequency.

11. The combination of claim 10 wherein the comparing means includes a phase comparator, means for coupling the secondary winding to a first input of the phase comparator, and means for coupling the output of the voltage controlled oscillator to a second input of the phase comparator.

12. The combination of claim 11 wherein the means for coupling the comparing means to the generating means comprises a low pass filter, means for coupling the output of the phase comparator to the low pass filter, and means for coupling the low pass filter to the input of the voltage controlled oscillator.

13. The combination of claim 11 wherein the means for coupling the secondary winding to the first input of the phase comparator comprises means for attenuating the signal from the secondary winding, means for coupling the secondary winding to the attenuating means, and means for coupling the attenuating means to the first input of the phase comparator.

* * * * *